United States Patent [19]
McKim

[11] Patent Number: 5,427,470
[45] Date of Patent: Jun. 27, 1995

[54] APPARATUS FOR APPLYING SEAMLESS FLOORING MATERIAL

[75] Inventor: Alan M. McKim, Oakville, Canada

[73] Assignee: Leemac Industries, Inc., Melrose Park, Ill.

[21] Appl. No.: 97,369

[22] Filed: Jul. 26, 1993

Related U.S. Application Data

[63] Continuation-in-part of Ser. No. 851,727, Aug. 17, 1992, Pat. No. 5,292,040.

[51] Int. Cl.6 .............................................. E01C 19/18
[52] U.S. Cl. ..................................... 404/110; 404/118
[58] Field of Search .............. 404/101, 108, 110, 111, 404/118, 128; 56/14.9, 15.7; 172/677; 222/164, 168, 608, 612

[56] References Cited

U.S. PATENT DOCUMENTS

| | | | |
|---|---|---|---|
| 3,230,845 | 1/1966 | Mauldin | 404/110 |
| 3,373,669 | 3/1968 | Schmitz | 404/110 |
| 3,456,566 | 7/1969 | Lazaro | 404/108 |
| 3,482,494 | 12/1969 | Jennings | 404/110 |
| 3,588,155 | 6/1971 | Hirt | 291/1 |
| 3,884,395 | 5/1975 | Keenan | 404/108 X |
| 4,310,293 | 1/1982 | Eggleton | 404/108 X |
| 4,496,265 | 1/1985 | Fragale | 404/110 |
| 5,292,040 | 3/1994 | McKim | 404/118 X |

Primary Examiner—Ramon S. Britts
Assistant Examiner—James A. Lisehora
Attorney, Agent, or Firm—Jones, Day, Reavis & Pogue

[57] ABSTRACT

An applicator for applying seamless flooring material to a subfloor is disclosed. The preferred embodiment includes a chassis steerably mounted on wheels which are propelled by hydraulic motors in series. A dispensing hopper on a frame is towed behind the chassis from a shaft on a steering column and enabled to move in three dimensions independent of the chassis. The hopper is supported by hopper wheels with an axle directly above a screed blade which distributes the flooring material dispensed out of the hopper. The height of each side of the hopper is independently adjustable on each side by screw-threaded rods and is not disrupted by lifting the hopper out of operation.

16 Claims, 9 Drawing Sheets

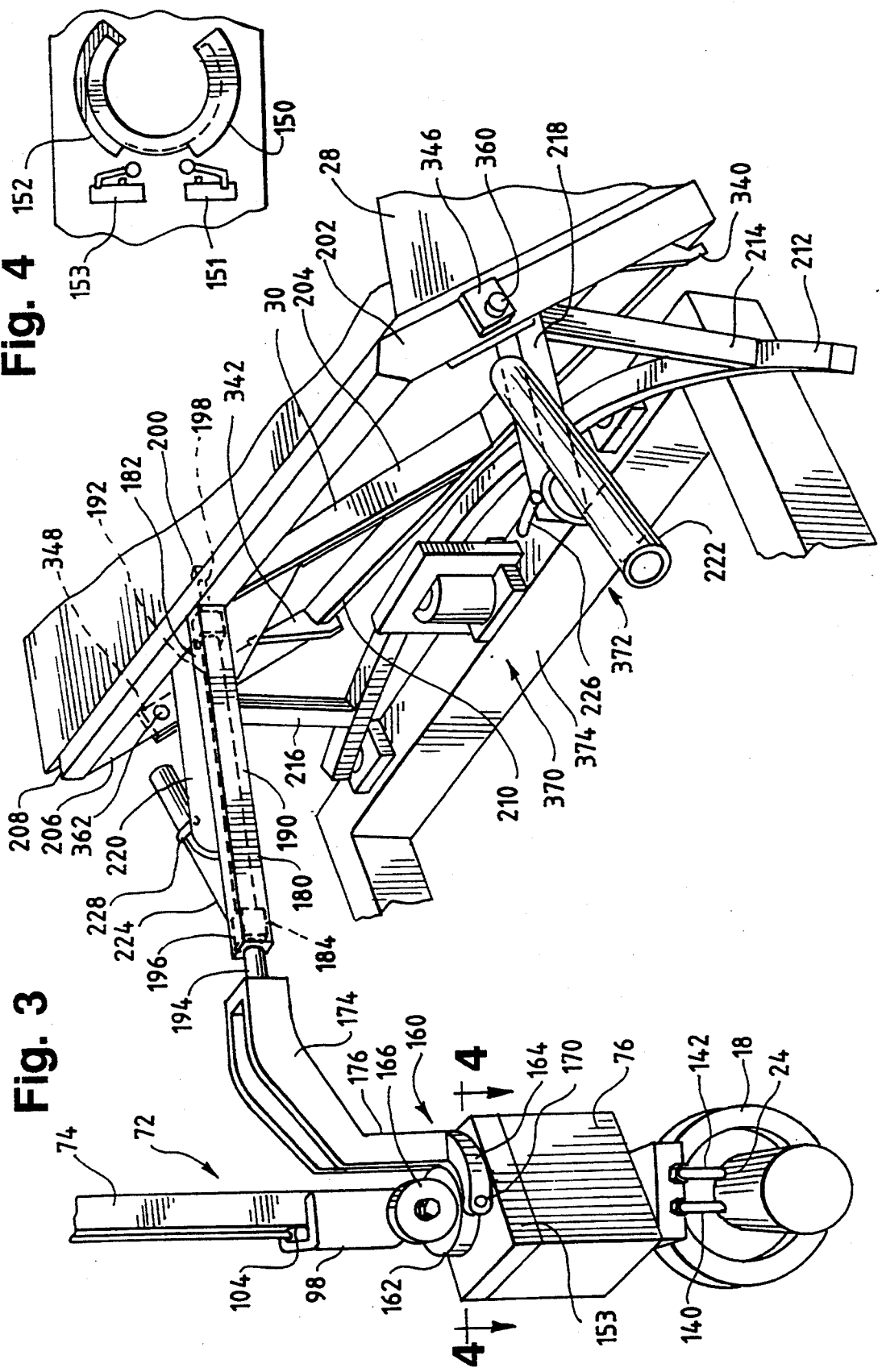

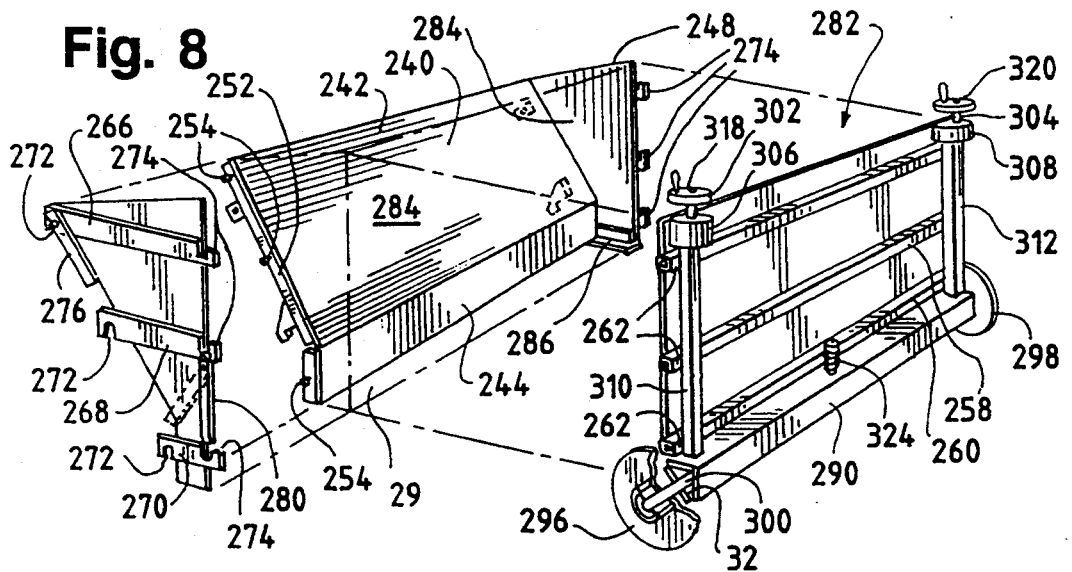

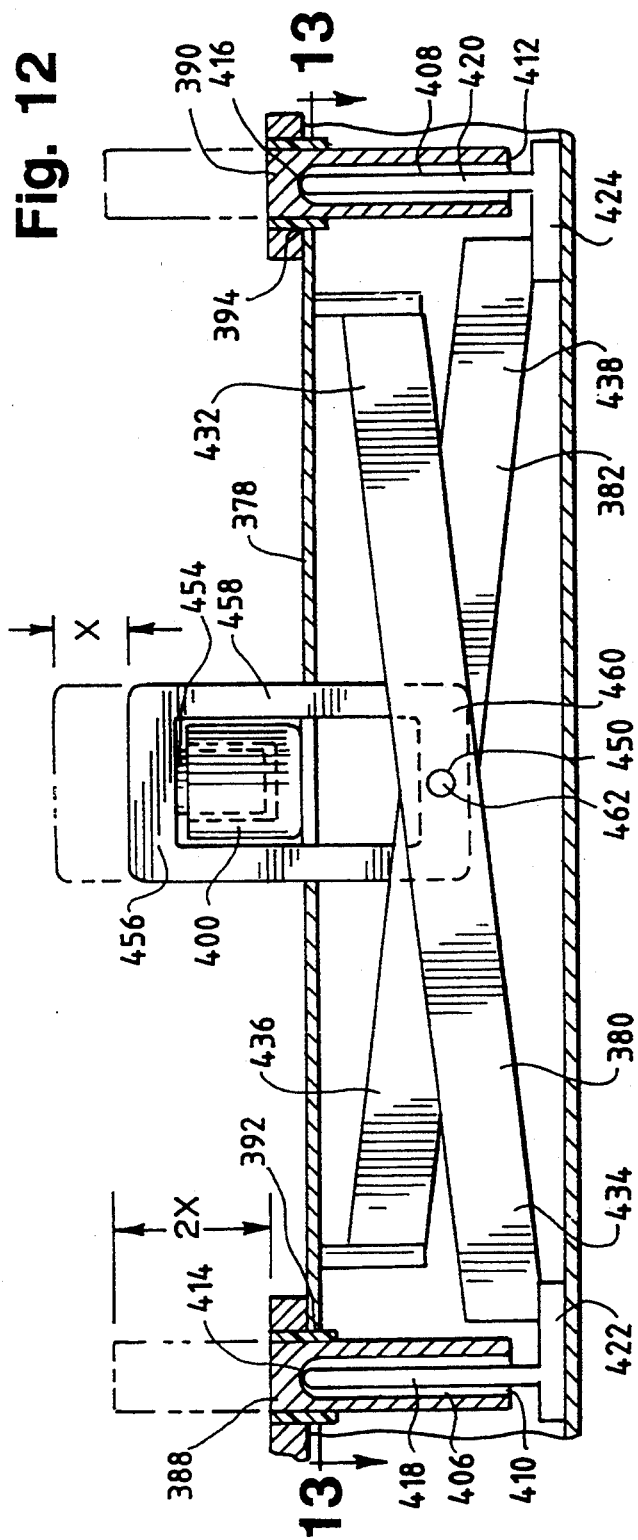
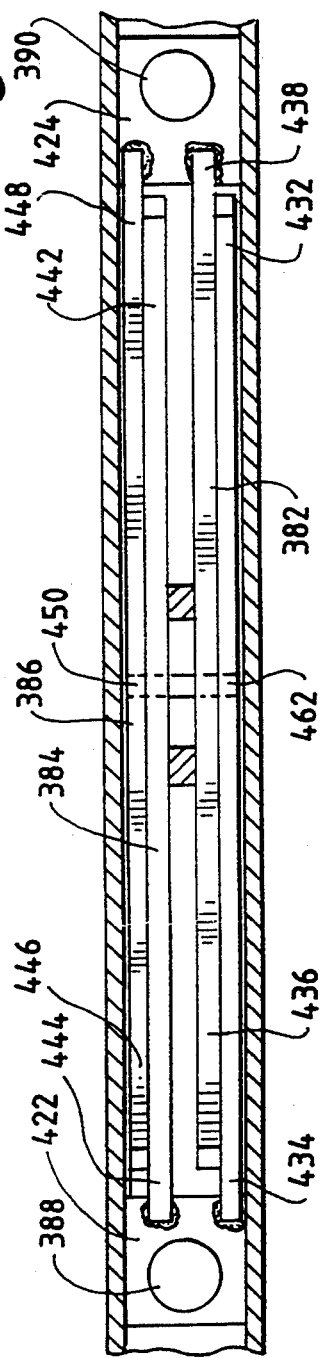

APPARATUS FOR APPLYING SEAMLESS FLOORING MATERIAL

This is a continuation in part of patent application Ser. No. 07/851,727, filed Aug. 17, 1992, now U.S. Pat. No. 5,292,040.

FIELD OF THE INVENTION

The present invention relates to an apparatus for applying seamless flooring materials and is an improvement of the invention disclosed in the parent patent application.

Typically, seamless flooring material consists of an epoxy overlay mixed with an aggregate. The mixture is applied to a subfloor by screeding. Conventionally, manual equipment has been used to apply the flooring material. Manual equipment includes a hand-pulled dolly with a rectangular hopper which dispenses the flooring material. The flooring material is dumped into the hopper from a wheelbarrow or pail, and the dolly and hopper is pulled by hand over the subflooring.

After the flooring material is applied, it is compacted and finished by a hand or power trowel. To minimize the labor intensity of this process, it is highly desirable to initially apply the flooring material as smoothly and evenly as possible to obtain optimum quality and efficiency. However, the manual equipment does not efficiently provide a smooth initial application of flooring material.

In the parent application Ser. No. 07/851,727, now U.S. Pat. No. 5,292,040 improved machinery for applying seamless flooring material to subfloors was provided by the present inventor, which enabled more efficient application of seamless flooring material. The present invention provides a further improvement of the inventive concepts of the prior invention which enables the application of seamless flooring material in an even more efficient manner.

In the prior application, a screeding device is taught in which a hopper and an attached screed blade are cantilevered a few inches behind the rear wheels of the chassis. Consequently, the screed blade and the rear wheels simultaneously react to an irregularity in the subfloor, rather than when the screed blade is directly over the irregularity.

For example, in the prior device, when either or both of the rear wheels of the chassis first cross a rise in a subfloor, the wheels elevate to overcome the rise. As the wheels begin to elevate, the screed blade attached to the hopper is a few inches behind the rise because it is cantilevered a few inches behind the rear wheels. The cantilever configuration causes the screed blade to elevate from the subfloor to the same elevation as the wheels even though the screed blade has yet to encounter the rising floor. The higher gap between the screed blade and the subfloor allows the hopper to deposit excessive flooring material. Consequently, a thicker coating is applied to the subfloor, which is incongruent with the rise in the subfloor. The opposite result occurs in the prior device if there is a decline in the subfloor. That is, when the wheels encounter a decline, too little flooring material is applied on the subfloor directly below the screed blade.

Thus, incongruent application of flooring material causes problems in regard to the application of the correct quantities of flooring material. For example, it may cause waste of flooring material with the accompanying cost disadvantages. Also, it causes increases in the labor intensity required to correct the incongruities which again results in higher costs of operation.

SUMMARY OF THE INVENTION

It is an object of the present invention to provide an applicator which more effectively applies seamless flooring material congruently with the lay of the subfloor.

To achieve this object, in the devices of the present invention, the hopper is not cantilevered off the back of a chassis. Instead, a frame on which a hopper is mounted is towed behind the chassis via a towing arrangement in which the hopper frame is towed by an elongated rod nested within a hollow tow bar fastened to the hopper frame. The nested rod is connected to the hopper frame at a first end to permit swiveling of the hopper frame about the rod in a plane perpendicular to the direction of travel of the hopper. A second end of the rod protrudes out of the tow bar and attaches to a goose neck tongue projecting from the surface of the chassis. The goose neck tongue includes a semicircular collar which is hingedly affixed to a disk that rotates about a steering shaft on the chassis.

This towing arrangement in which the hopper is interconnected with the chassis via a rod having its first end swivelably mounted to the hopper and the second end pivotally and hingedly mounted to the chassis enables the hopper on the hopper frame to both swivel and move in a hinged manner in planes normal to the subfloor. The towing arrangement further enables the hopper to pivot in a plane parallel to the subfloor. All of these hinging, swiveling and pivoting movements of the hopper are independent of the hinging, swiveling or pivoting motion of the chassis. Thus, the hopper reacts to irregularities in the floor, independently of the chassis.

The hopper is equipped with wheels on both sides of the hopper, with a wheel axis aligned with and immediately above the screed blade. Hence, the screed blade is not vertically affected by an irregularity in the subfloor unless the irregularity is directly under the screed blade.

Moreover, the height of the screed blade above the floor at each side of the hopper is independently adjustable by micrometer screw adjusting rods on each side of the hopper. Hence, the screed blade elevation is precisely controlled.

Another object of this invention is to provide an applicator which provides for lifting the hopper out of operation, even when the hopper is not aligned with the axis of travel of the chassis.

This object is accomplished by providing an arcuate jacking bar underneath the hopper frame. To raise the hopper out of operation, a hydraulic jack raises two pairs of crisscrossed crossing bars located in a box at the back of the chassis. One end of each pair of crossing bars is constrained against a top of the box, and another end of each pair of crossing bars is interconnected to a lifting ram. As the jack raises the crossing bars, the lifting rams rise to engage the jacking bar and lift the hopper frame onto which the hopper is mounted out of operation.

The jacking system is arranged so that each lifting ram raises equivalently, regardless of the load on that lifting ram. When the hopper is out of alignment with the chassis during application or preparatory maneuvers, the load is not evenly distributed on each ram. However, upon actuation of the hydraulic jack, each lifting ram will engage the arcuate jacking bar to lift the hopper frame and hopper out of operation, irrespective of load disparity.

The present invention in its various aspects has only been summarized briefly. For a better understanding of the present invention and its objects and advantages, reference should be made to the following description of its preferred embodiment taken in conjunction with the accompanying drawings.

BRIEF DESCRIPTION OF THE DRAWINGS

A preferred embodiment of the present invention is described with reference to the accompanying drawings:

FIG. 3 is a perspective view of a towing arrangement of the present invention;

FIG. 4 is a plan view taken along line 4—4 of FIG. 3;

FIG. 8 is an exploded view of a hopper of the present invention;

FIG. 9 is a rear cut-away view of the hopper of FIG. 8;

FIG. 10 is a cross-sectional view along line 10—10 of FIG. 9;

FIG. 12 is a cut-away view taken along line 12—12 of FIG. 11;

FIG. 13 is a cut-away view along line 13—13 of FIG. 12; and 14 is a plan view of the jacking system shown in FIG. 11.

DETAILED DESCRIPTION OF THE PREFERRED EMBODIMENT

This description incorporates by reference the disclosure of patent application Ser. No. 07/851,727, now U.S. Pat. No. 5,292,040 so reference may be made to that application for specific details which may be utilized but are not essential to the construction and operation of the herein disclosed devices.

Figure 1:
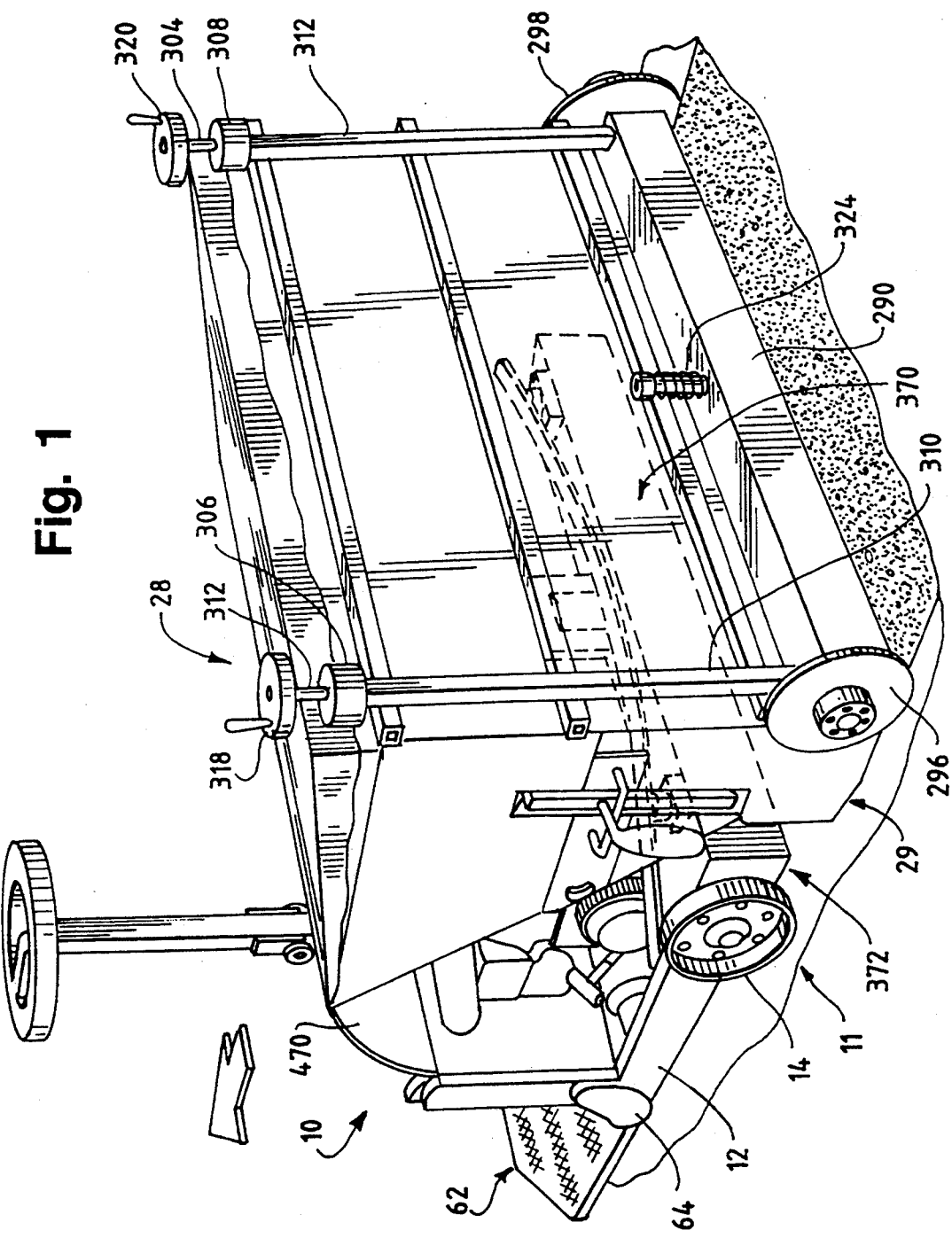
FIG. 1 is a rear perspective view of the present invention.
Figure 2:
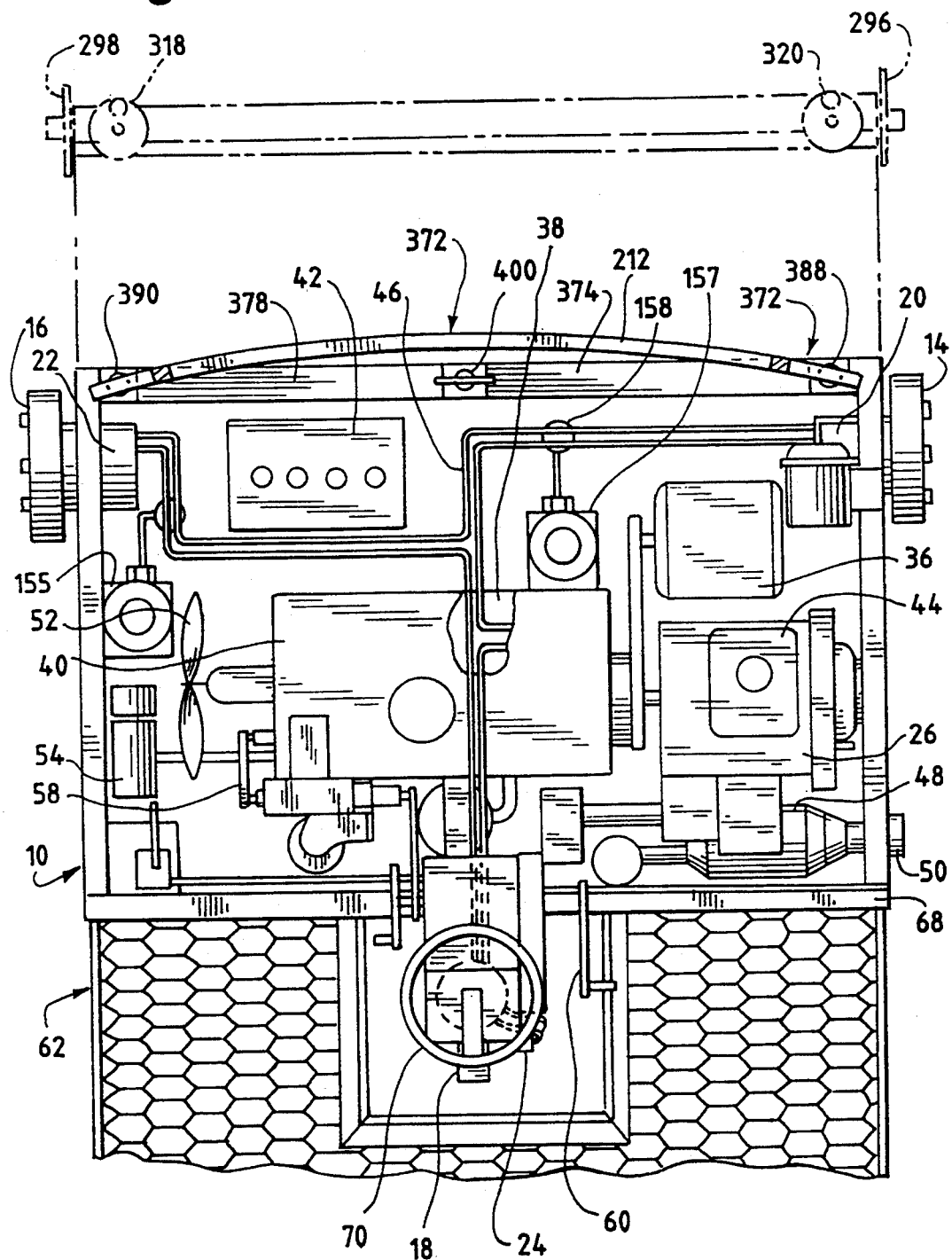
FIG. 2 is a top plan view of the present invention.
Figure 5:
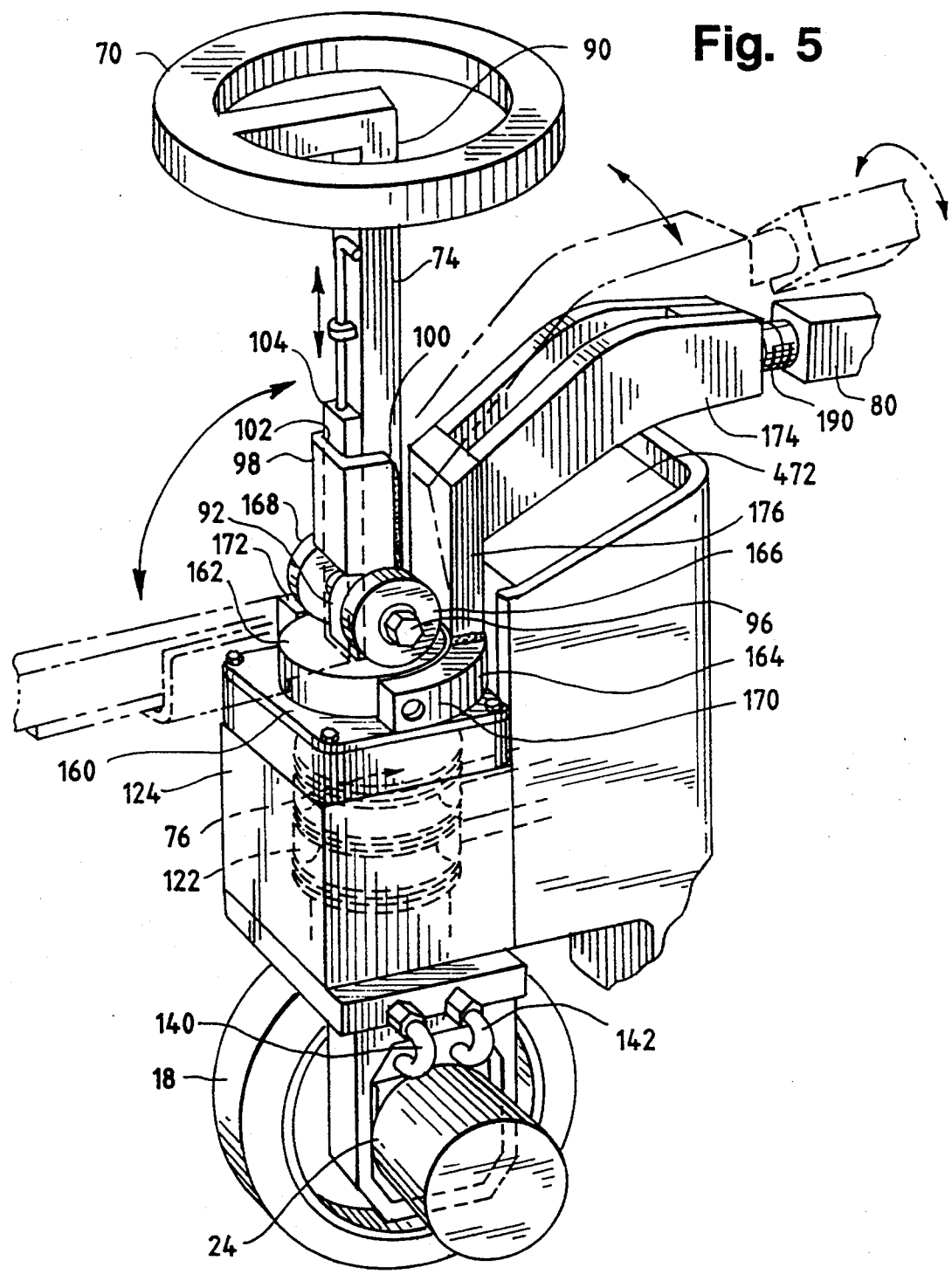
FIG. 5 is an enlarged perspective view of a steering assembly of the present invention.

The applicator 10 positioned on a subfloor 11 is illustrated generally in FIG. 1 and schematically in FIG. 2. The applicator includes a chassis 12 which is supported by three wheels, namely two fixed rear wheels 14 and 16 and a pivotable front wheel 18. Each wheel is turned by separate hydraulic motors 20, 22 and 24, respectively, which are in series and are powered by a gasoline engine 26.

A dispensing hopper 28 is supported by a hopper frame 30 which is towed from the chassis 12 in a towing arrangement best shown in FIG. 3. The flooring material is contained in the hopper 28. An opening 29 in the bottom of the hopper 28 dispenses the flooring material on the subfloor 11 as the chassis 12 tows the hopper about the subfloor 11. A screed blade 32 positioned rearwardly of the opening 29 compacts and distributes the flooring material.

The gasoline engine 26, equipped with an alternator 36 to provide power to accessory equipment, is interconnected to a variable displacement hydraulic pump 38, located under a hydraulic fluid reservoir 40. A 12-volt battery 42 and a gas tank 44 connected to the engine 26 are also provided. A muffler and a catalytic converter 48 connect to the downward engine exhaust port 50. A fan 52 provides for engine and hopper cooling, and a hydraulic pump 54 underneath the fan supports hydraulics unrelated to locomotion.

The hydraulic pump 38 provides a volume of hydraulic fluid to the positive-displacement hydraulic motors 20, 22 which power the rear wheels 14, 16, respectively, and motor 24 powers the front wheel 18. The motors 20, 22, 24 are connected to the hydraulic pump 38 in series by conduit 46 from the rear wheel 14 to the rear wheel 16 to the front wheel 18, respectively, and thence back to the pump 38.

The hydraulic system with motors 20, 22, 24 connected in series to pump 38 produces high torque and ensures that the same volume of fluid passes through each motor 20, 22, 24. Thus, each wheel 14, 16 and 18 normally rotates at the same speed regardless of the torque requirement. Unless turning, the applicator 10 travels in a straight line for good control.

The speed of the applicator 10 is adjusted via speed control 58, which adjusts the volume delivery from the hydraulic pump 38, by adjusting the angle of a swashplate therein. A forward and reverse control is also provided, in the form of a shift lever 60 connected to a spool valve which reverses the direction of hydraulic fluid flow through the conduit 46 to the motors 20, 22, 24.

An operator's platform 62 cantilevers off a front 64 of the chassis 12. The operator stands on the platform 62 facing rearwardly, toward the hopper 28.

Figure 6:
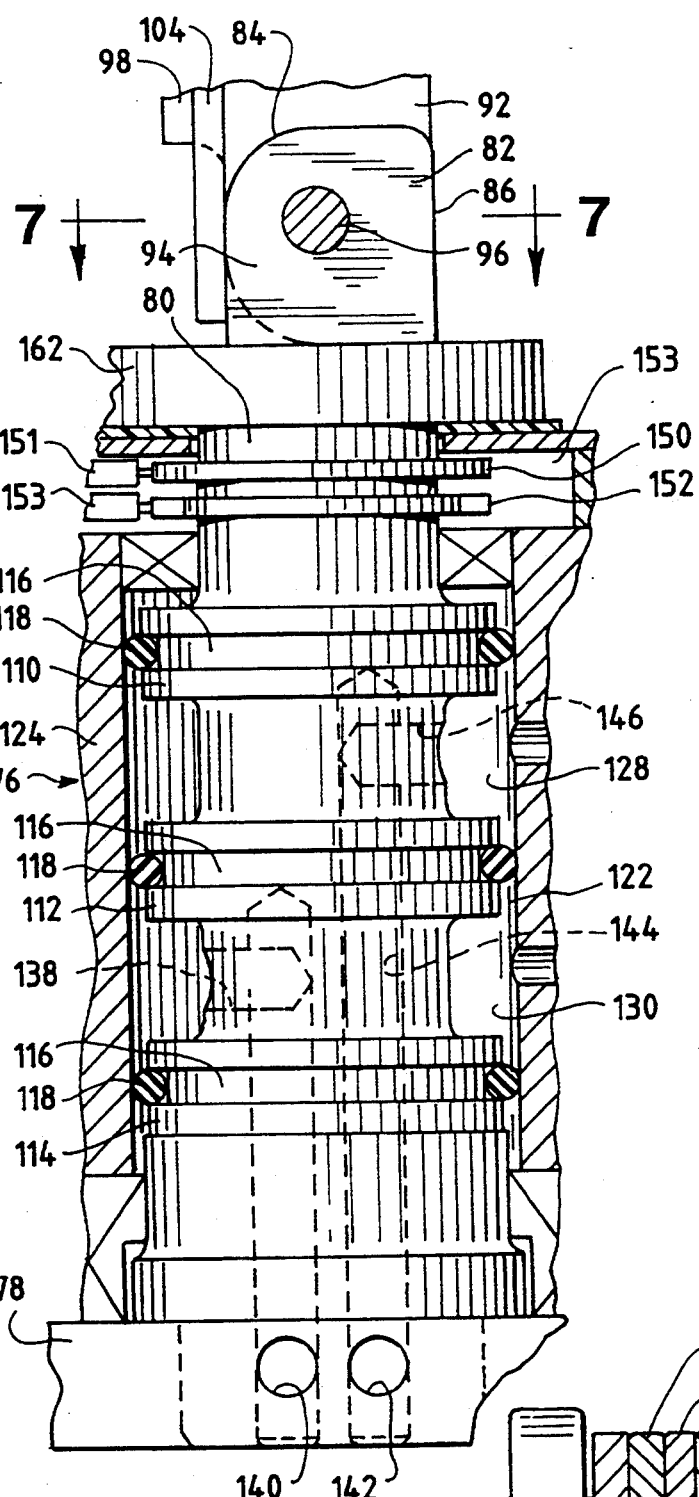
FIG. 6 is a segmented cut-away view of the steering assembly shown in FIG. 5.
Figure 7:
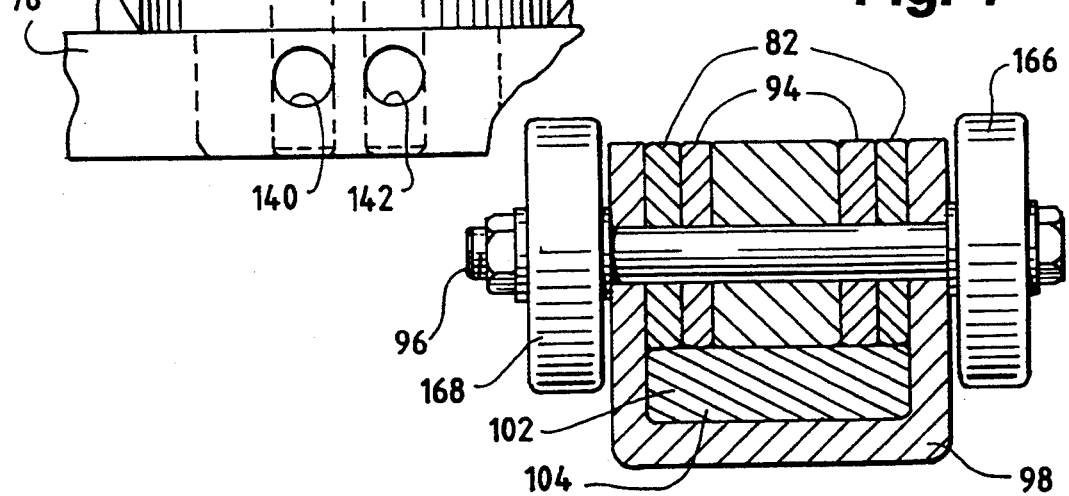
FIG. 7 is a cross-sectional view taken along line 7—7 of FIG. 6.
Figure 11:
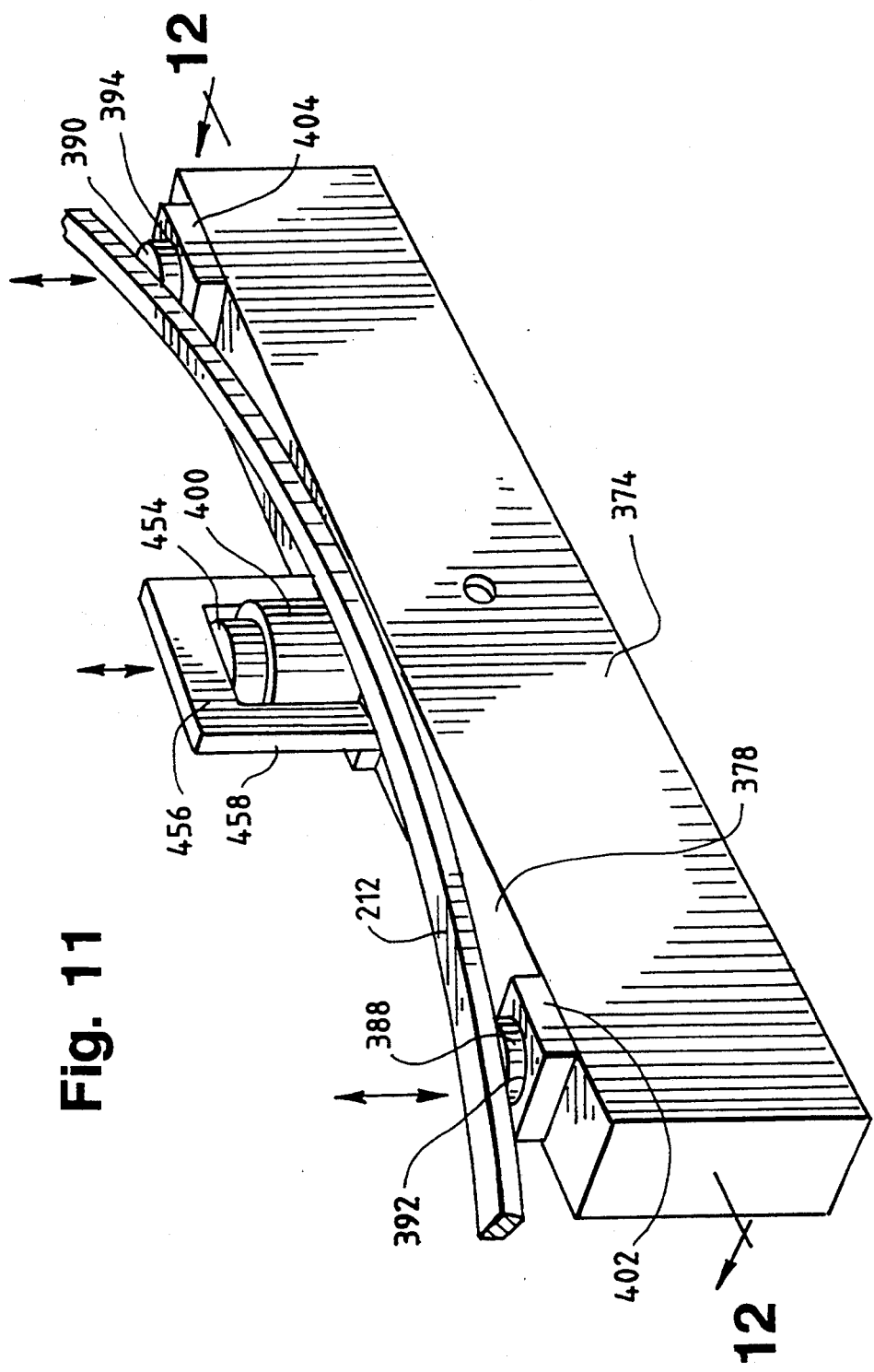
FIG. 11 is a rear view of a jacking system of the present invention.
Figure 14:
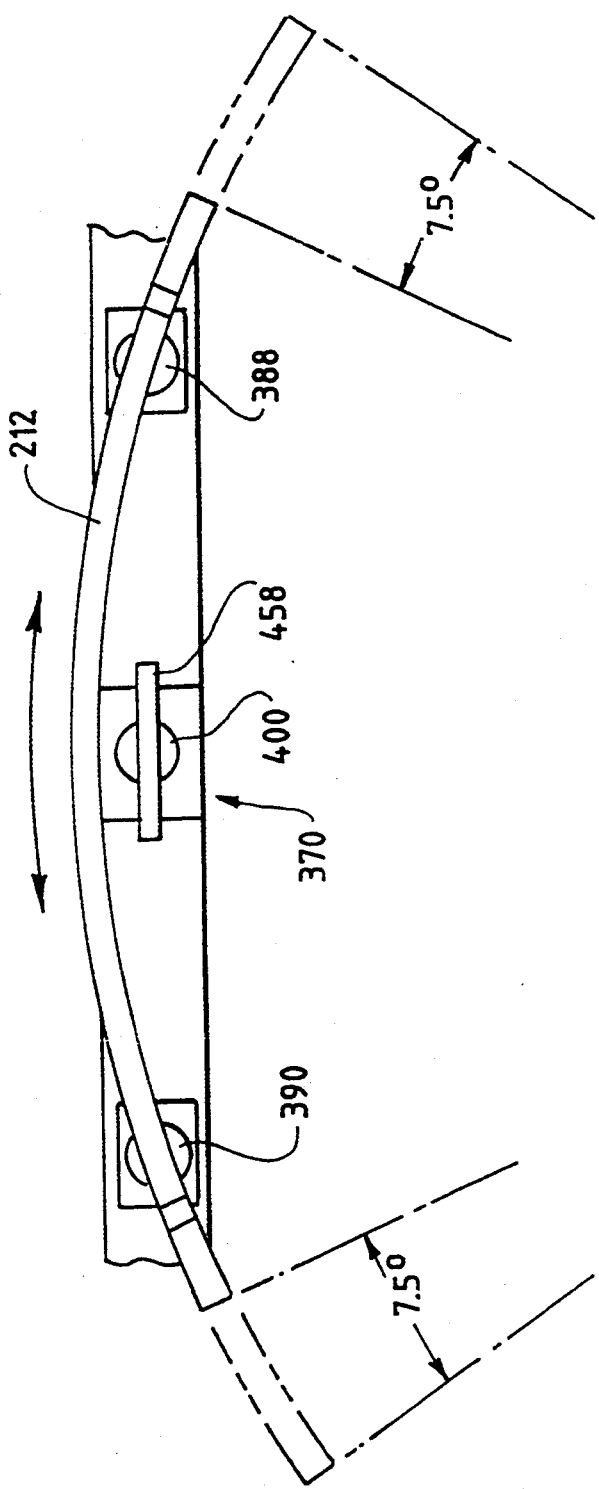

The steering assembly 69 is shown in FIGS. 3–7. A steering wheel 70 operates the front wheel 18 and is mounted on a foldable steering column 72 having a top elongated shaft 74 and a bottom elongated shaft 76. The bottom shaft 76 is best shown in FIG. 6. The shaft 76 has a base 78 which interconnects to front wheel 18 and a top 80 from which two narrow shoulders 82 extend upward. The two flat shoulders each have a rounded edge 84 and a straight edge 86 with a profile similar to a quadrant of a circle.

The top shaft 74 has a top 90 which connects to the steering wheel 70 and a base 92 from which two flat shoulders 94, with the same profile as the shoulders 82 on the bottom shaft 76, extend downward. The shoulders 82 of the bottom shaft 76 are spaced apart sufficiently to receive the shoulders 94 of the top shaft 74. A bolt 96 inserted through both pairs of shoulders 82, 94 hingeably couples the shafts 74, 76 together. The two pairs of shoulders meet so as to only allow the top shaft 74 to fold toward the front 64 of the chassis 12. The steering column 72 is folded down to keep it clear of equipment used to load the hopper 28 with material.

A U-shaped bracket 98 is welded near the base 92 of the top shaft 74 to envelop a segment 100 of the top shaft 74 but leave a space 102 between the top shaft 74 and the bracket 98. When a lock bar 104 is inserted into the space 102 between the top shaft 74 and the bracket 98, the top shaft 74 is locked and prevented from folding down over the bottom shaft 76, thus preventing the steering column 72 from folding during operation.

Three radial ridges 110, 112, 114 extend from the bottom shaft each with valleys 116 for O-rings 118. The bottom shaft 76 inserts through a cylindrical bore 122 in a stationary steering block 124. The three rims 110, 112, 114 and the cylindrical bore 122 provide two annular chambers 128, 130. The O-rings 118 on each partition rotatably engage an inside wall 132 of the bore 122 to seal each chamber 128, 130 from the other chamber 130, 128 and the atmosphere, but yet allow the bottom shaft 76 to rotate within the bore 122.

The conduit 46 from the hydraulic motor 22 for the back wheel 16 commutes fluid to the chamber 130. An entry 136 in the bottom shaft 76 opens from chamber 130 to an axial tunnel 138 which travels down the bottom shaft 76 to communicate with a pipe 140 which enters the hydraulic motor 24 for the front wheel 18. An exit pipe 142 from front wheel motor 24 communicates with another axial tunnel 144 in the bottom shaft 76 to an exit 146 in chamber 128. The conduit 46 from chamber 128 commutes fluid to the hydraulic motor 20 for the back wheel 14. This arrangement permits the front wheel 18 to rotate around without any impediment from hydraulic fluid conduit 46 in communication with the hydraulic motor 24 on the front wheel 18.

Two semicircular cams 150 and 152 project perpendicularly from the bottom shaft 76 within cam housing 154 above the steering block 124. The cams 150, 152 have offset elevations on the bottom shaft 76. The cams encircle the bottom shaft 76 for about 100 degrees on each side of shaft 76. The cams 150, 152 are not normally in contact with microswitches 151, 153, respectively, which are also in compatible offset positions.

When the front wheel 18 is turned more than five degrees to the right of a forward axis of travel, the cam 150 initiates contact with the microswitch 151. When the front wheel 18 is turned more than five degrees to the left of the forward axis of travel, the cam 152 initiates contact with the microswitch 153.

When the cam 150 contacts the microswitch 151, the microswitch 151 activates a solenoid 155 which operates a conventional hydraulic fluid bypass valve 156 to bypass hydraulic fluid around the hydraulic motor 22 for the wheel 16 on the inside of the right turn. When the cam 152 contacts the microswitch 153, microswitch 153 activates a solenoid 157 which operates a conventional hydraulic fluid bypass valve 158 to bypass fluid around the hydraulic motor 20 for the wheel 14 on the inside of the left turn. Consequently, the applicator is capable of making very sharp turns.

A gimbal hitch 160 comprises a gimbal disc 162 which sets flat upon the cam housing 154 and a semicircular collar 164. The disc 162 mounts the bottom shaft 76 at a cylindrical portion thereof, so the disc 162 is free to rotate around the bottom shaft 76 of the steering column 72. The disc 162 is maintained flush on the housing 154 by a pair of shaft wheels 166, 168 maintained adjacent to the top elongated shaft 74 of the steering column 72 with the same bolt 96 used to hingeably connect the top shaft 74 to the bottom shaft 76. As the disc 162 rotates, the shaft wheels 166, 168 rotate but prevent the disc 162 from traveling up the top shaft 74 of the steering column 72.

The semicircular collar 164 circumferences half of the gimbal disc 162. Diametrical ends 170, 172 of semicircular collar 164 each hingeably attach to the gimbal disc 162 to provide for vertical hinging of the collar 164. A goose neck tongue 174 is rigidly connected to collar 164 via prop 176. Consequently, goose neck tongue 174 horizontally pivots about an axis through the top shaft 74 of steering column 72 and vertically hinges in a plane through said steering column 72. The goose neck tongue 174 interconnects to the hopper 28.

This arrangement also enables the hopper 28 to horizontally pivot about an axis through the top shaft 74 of steering column 72 and vertically hinge in a plane through said steering column 72.

A hollow tow bar 180 has a hopper end 182 and a chassis end 184. The hopper end 182 rigidly connects to a hopper frame 30 and extends over the chassis 12. An elongated rod 190 which nests inside the hollow tow bar 180 also has a hopper end 192 and a chassis end 194. The chassis end 194 of the elongated rod 190 protrudes beyond the chassis end 184 of the tow bar 180 and is welded to the goose neck tongue 174. A bushing 196 between an interior of the tow bar 180 and an exterior of the rod 190 at the chassis ends 182, 192 facilitates swiveling of said tow bar 180 and hopper frame 30 about said rod 190.

A screw-threaded bolt 198 inserts through the hopper frame 30 and into the hopper end 182 of the tow bar 180 to firmly engage a female screw-threaded opening in the hopper end 192 of the elongated rod 190. A head 200 of the bolt 198 provides the association that enables the chassis 12 to tow the hopper 28, however, the hopper frame 30 and tow bar 180 swivel about the bolt 198 and the bushing 196, so the hopper 28 swivels independently of the chassis 12. Each side of the screed blade 32 reacts separately to irregularities in the subfloor that are encountered only by one side of the hopper 28.

Through the interconnection of the hopper 28 to the gimbal hitch 160 mounted on the steering column 72 via the elongated rod 190 and the tow bar 180, the hopper swivels in a plane normal to the subfloor, hinges in a plane normal to the subfloor perpendicular to the plane of swiveling and pivots in a plane parallel to the subfloor. Hence, the hopper moves in all three dimensions independently of the movement of the chassis.

As shown in FIG. 3, the hopper frame comprises three vertical bars 202, 204, 206 and two horizontal bars 208, 210. An arcuate jacking bar 212 interconnects to the hopper frame 30 where bar 210 meets bar 204 and at bars 202 and 206 via braces 214 and 216.

Arms 218, 220 extend from the hopper frame on each side to support a left pointer light 222 and a right pointer light 224, respectively. The pointer lights 222, 224 focus narrow light beams on the subfloor 11 to assist the operator in maintaining alignment of the applicator 10. Locking handles 226, 228 lock each pointer light 222, 224 as desired.

The assembly of the hopper 28 is shown in FIGS. 8-10. The hopper 28 is assembled by four panels: a front panel 240 with an angular top side 242 and a bottom side 244, two side panels 246, 248 and a rear panel 250. The front panel 240 has a perpendicular flange 252 on each edge. Three bolts 254 protrude from each flange 252. The rear panel 250 has three reinforcing square tube members 256, 258 260 with notches 262 on each end thereof.

Each side panel 246, 248 includes three horizontal slats 266, 268, 270 with front slots 272 and back teeth 274. To assemble the hopper 28, the front slot 272 on each slat 266, 268, 270 engages the bolts 254 on the flange 252 of the front panel 240. The back teeth 274 on each slat 266, 268, 270 engage the notches 262 in the square tube members 256, 258, 260. On each side of the hopper 28, a front latch 276 on slat 266 secures the front 240 and side panels 246, 248 together by swinging down, so a slot 278 in the latch engages bolt 254. A back latch 280 on each side secures the back panel 250 and side panels 246, 248 together by swinging down to bear against the reinforcing square tube member 260. When the panels are assembled, a loading opening 282 is left above and the dispenser opening 29 is left underneath.

An inside of the hopper is preferably lined with replaceable plastic liners 284, to eliminate sticking, thereby ensuring smooth material flow and easy cleanup. At the bottom of the side panels 246, 248 are horizontal deflectors 286, which serve to reduce the amount of material deposited outside the hopper 28 and minimize ridging.

As best shown in FIGS. 9 and 10, a rectangular angle iron 290 extends off the rear panel 250 to communicate with the dispenser opening 29. The screed blade 32 is welded into the angle iron 290 at an approximate 45 degree angle from the subfloor 11 underneath. The plastic liner 284 is set against the rear panel 250 and screed blade 32. During application, the screed blade 32 is drawn over the deposited flooring material to distribute and compact the material for a flat and even distribution on the subfloor 11.

The hopper 28 is supported off the ground by hopper wheels 296 and 298 which are connected by an axle 300. Preferably, the wheels 296, 298 are one-eighth inch thick. The axle 300 is aligned with and directly above the screed blade 32. This alignment provides that the screed blade 32 reacts to subfloor irregularities only when the hopper wheels 296, 298 encounter the same irregularity in the subfloor 11. Hence, flooring material is distributed out of the hopper 28 by the screed blade 32 in congruence with the lay of and irregularities in the subfloor 11.

The height of each side of the hopper 28 off the subfloor 11 is independently adjustable by micrometer screw adjusting rods 302 and 304, respectively. Screw rods 302 and 304 are held in position by bushings, 306, 308, respectively.

Each screw-threaded rod 302, 304 extends down the rear panel 250 on each side of the hopper 28 through a rectangular housing 310, 312. Each screw-threaded rod 302, 304 engages a female screw-threaded block 314, 316 which fits inside the housing and bears against the axle 300 on each side of the hopper. As each screw threaded rod 302, 304 is rotated by a hand crank 318, 320, the rectangular housing prevents the block from rotating, promoting axial movement of the block 314, 316. Thus, the height of each side of the hopper 28 is independently adjustable by rotating each screw-threaded rod 302, 304. Preferably, one revolution of screw rod 302, 304 will raise or lower the respective side of the hopper 28 by one-sixteenth of an inch.

A bolt 324 extends through an aperture 326 in angle iron 290 and attaches to the wheel axle 300. A spring 328 coiled around the bolt 324 is constrained between a head 330 of the bolt 324 and the angle iron 290 around the aperture 326 to bias the wheel axle 290 against the blocks 314, 316 of the screw-threaded rods 302, 304. The spring 328 and bolt 324 maintain each side of the axle 300 at a highest position commensurate with the setting of the screw-threaded rods 302, 304 when the hopper 28 is lifted out of operation.

As shown in FIG. 3, the hopper 28 is mounted on the hopper frame 30 during operation with rigid hooks 340, 342 on each side of the front panel 240 of the hopper 28. Both hooks slide over horizontal bar 210 to support the hopper 28 on the frame 30. A bracket 346, 348 on each side of front panel 240 has an aperture which aligns with an aperture in vertical bars 202, 206. Pins 360, 362 insert through the aligned apertures on each side of the hopper 28 to maintain the hopper 28 in position on the hopper frame 30.

As shown in FIGS. 11-14, a jacking system 370 at the rear 372 of the chassis 12 returnably lifts the hopper 28 and hopper frame 30 out of operation. The jacking system 370 is housed in a rectangular jack box 374 with a top 378 and comprises two pairs of crisscrossed crossing bars, a front pair 380 and 382, and a back pair 384 and 386, two cylindrical lifting rams 388 and 390, which protrude through apertures 392 and 394 in the top 378 of the box 374, respectively, and a hydraulic jack 400.

Bushings 402, 404 ensure that the rams 388, 390 protrude through the apertures 392, 394 only perpendicularly. Each lifting ram 388, 390 has an axial cavity 406, 408 through one end 410, 412 of the ram 388, 390 up to a ceiling 414, 416 in the cavity 406, 408. A dowel 418, 420 fixed to an anvil 422, 424 extends up to the ceiling 414, 416 in the cavity to support the ram 388, 390 from underneath. The dowel 418, 420 has adequate clearance from the cavity 406, 408 to permit lateral movement inside the cavity 406, 408.

Front crossing bar pair 380, 382 and back crossing bar pair 384, 386 form a pair of concentric "X'es." Crossing bar 380 has an end 432 bearing against the top 378 and an end 434 connected to the anvil 422, and crossing bar 382 has an end 436 also bearing against the top 378 and end 438 connected to anvil 424. Likewise, crossing bar 384 has an end 442 bearing against the top 378 and an end 444 connected to the anvil 422, and crossing bar 386 has an end 446 bearing against the top 378 and end 448 connected to anvil 424. Crossing bars 380, 382, 384 and 386 all have a center aperture which align to form common apertures 450.

The hydraulic jack 400 has a piston 454 which bears against a top 456 of a rectangular yoke 458. A bottom 460 of the rectangular yoke 458 is anchored to each crossing bar 380, 382, 384 386 by a pin 462 through the common apertures 450. The jack 400 is driven by hydraulic pump 54. When the piston 454 of jack 400 is actuated upward, the rectangular yoke 458 is hoisted to lift all crossing bars 380, 382, 384, 386. Crossing bars 380, 382, 384, 386 carry upward the anvils 422, 424 connected to ends 434, 444 and 438, 448, respectively. The anvils 422, 424 lift the dowels 418, 420 which bear against the ceilings 414, 416 of the cavities 406, 408 to raise the lifting rams 388 and 390.

When crossing bars 380, 382, 384, 386 are lifted, the ends 434, 438, 444, 448 move in an arcuate motion causing the anvils 422, 424 to move horizontally, as well as vertically. However, the dowel 418, 420 pivots inside the cavity 406, 408 to absorb the horizontal motion of the anvil 422, 424 while transferring vertical motion of the anvil 422, 424 to the ceiling 414, 416 of the cavity 406, 408, thereby raising the ram 388, 390.

During lifting, lifting rams 388, 390 engage the arcuate jacking bar 212 to lift the jacking bar 212 which supports the hopper frame 30 and the hopper 28 out of operation. The lifting rams 388, 390 elevate to the same height, irrespective of the load on each lifting ram 388, 390. Hence, when the hopper is out of alignment with the chassis, both lifting rams 388, 390 lift the hopper frame 30 despite the disparate weight distribution on each ram 388, 390.

The arcuate jacking bar 212 which supports the hopper frame 30 is configured with a radius, so that part of the jacking bar 212 will rest directly over each piston 388, 390, unless the tow bar 180 is greater than 7.5 degrees from a forward axis of travel.

The hydraulic jack 400 is deactuated downward to lower the lifting rams 388, 390 and return the hopper 28 back to operating position. Because the hopper 28 is only supported by the wheels 296, 298, the operating height of each side of the hopper 28 is not disrupted by lifting hopper 28 out of operation. The height of each side of the hopper 28 with respect to the wheels 296, 298 and subfloor 11 is dependent on the setting of the screw rods 302, 304 and is thus not subject to change when the hopper 28 is lifted out of operation.

A plastic cover 470 is provided to protect a control panel 472 and other components of the chassis 12 from accidental spillage during hopper 28 loading.

The hopper 28 can be built in any desirable and reasonably workable width. It is desirable to have a hopper width which evenly divides the width of the corridor. Corridors are typically either 10 or 12 feet wide, so widths of four feet and five feet have proved convenient. The same chassis can be used to support hoppers of various widths, so that the hoppers can be readily interchanged to suit the job.

It will be appreciated that the detailed description relates to the preferred embodiment by way of example only. Many variations on the invention will be obvious to those knowledgeable in the field, and such obvious variations are within the scope of the invention as described and claimed, whether or not expressly described.

I claim:

1. An applicator for applying seamless flooring material to a subfloor, comprising:
   a steerable motorized chassis mounted on chassis wheels;
   a hopper frame;
   a dispensing hopper mounted on said hopper frame, said hopper having an opening for dispensing flooring material, a screed blade for distributing flooring material positioned rearwardly of said opening, and hopper wheels with an axle above said screed blade for supporting said hopper; and
   an elongated rod interconnecting said chassis and said hopper frame for towing said hopper on said hopper frame behind said chassis, said elongated rod having a first end hingedly and pivotally attached to said chassis and a second end swivelably connected to said hopper frame to permit said hopper mounted on said hopper frame to move independently of said chassis and to swivel in a plane normal to a subfloor, to hinge in a plane normal to said subfloor and perpendicular to the plane of swiveling and to pivot in a plane parallel to the subfloor.

2. The applicator of claim 1, wherein said hopper has two sides, each side of said hopper having an adjustable screw-threaded rod which engages a screw-threaded block which bears against said axle for independently adjusting the elevation of said side of said hopper when rotated.

3. The applicator of claim 2, including a jacking system positioned rearwardly of said chassis, said jacking system engaging an arcuate jacking bar appended to said hopper frame for returnably lifting said hopper.

4. An applicator for applying seamless flooring material to a subfloor, comprising:
   a steerable motorized chassis mounted on chassis wheels,
   a hopper frame,
   a dispensing hopper mounted on said hopper frame, said hopper having an opening for dispensing flooring material, a screed blade for distributing flooring material positioned rearwardly of said opening, and hopper wheels with an axle above said screed blade for supporting said hopper,
   an elongated rod interconnecting said chassis and said hopper frame for towing said hopper on said hopper frame behind said chassis, said elongated rod having a first end hingedly and pivotally attached to said chassis and a second end swivelably connected to said hopper frame to permit said hopper mounted on said hopper frame to move independently of said chassis and to swivel in a plane normal to a subfloor, to hinge in a plane normal to said subfloor and perpendicular to the plane of swiveling and to pivot in a plane parallel to the subfloor,
   a goose neck tongue connecting said first end of said elongated rod to said chassis,
   a shaft mounted on said chassis, and
   a disc which pivots about said shaft for enabling said hopper on said hopper frame to pivot in a plane parallel to the subfloor and move in a hinging manner in a first plane normal to said subfloor independently of said chassis,
   said chassis hingedly attached to said goose neck tongue, and said goose neck tongue including a collar which is hingedly attached to said disc.

5. The applicator of claim 4, wherein said shaft on said chassis comprises a steering column.

6. The applicator of claim 5, including
   a hollow tow bar having said elongated rod concentrically nested therein;
   said hollow tow bar having a first end sustained by said hopper frame;
   said hollow tow bar having a second end through which said first end of said elongated rod protrudes and attaches to said goose neck tongue; and
   a bushing outside said first end of said rod and inside said second end of said hollow tow bar for facilitating the swiveling of said hopper frame about said elongated rod.

7. The applicator of claim 6, wherein said hopper has two sides, each side of said hopper having an adjustable screw-threaded rod which engages a screw-threaded block which bears against said axle for independently adjusting the elevation of said side of said hopper when rotated.

8. The applicator of claim 7, including a jacking system positioned rearwardly of said chassis, said jacking system engaging an arcuate jacking bar appended to said hopper frame for returnably lifting said hopper.

9. The applicator of claim 8, wherein said jacking system includes:
   a rectangular box for housing said jacking system having an interior, a top, a center slot and a first and second side aperture in said top;
   a first lifting RAM;
   a first cross bar with a top end against the top of said box, a center, and a bottom end interconnected to said first lifting ram which protrudes up through said first side aperture;
   a second lifting ram;
   a second cross bar with a top end against the top of said box, a center, and a bottom end interconnected to said second lifting ram which protrudes up through said second side aperture, said center of said cross bars crisscross at an intersection; and a hydraulic jack attached through said center slot to said intersection of said first and second cross bars for hoisting said first and second cross bars which respectively carry said first and second lifting rams through said first and second side apertures to equal heights regardless of a load disparity on said lifting rams.

10. The applicator of claim 9, wherein said arcuate jacking bar has a configuration with an equal radius throughout from a shaft on said chassis and dimensioned to rest on said first and second lifting rams when said tow bar is within a predetermined angle from an axis of travel.

11. The applicator of claim 10, wherein said lifting rams are guided by guide bushings to minimize lateral movement of said rams.

12. The applicator of claim 11, wherein said jacking system further includes:
a cavity within each lifting ram;
a dowel having two ends, a first end inserted into each cavity with clearance around sides of said dowel, and a second end extending outwardly of said cavity;
a front crossing bar and a back crossing bar;
an anvil attached to an end of each crossing bar for lifting said second end of said dowel to transfer vertical motion to said lifting ram and to minimize the horizontal motion transferred to said lifting ram when each said crossing bar is elevated.

13. The applicator of claim 9, wherein said predetermined angle is 7.5 degrees.

14. An applicator for applying seamless flooring material to a subfloor, comprising:
a steerable motorized chassis mounted on chassis wheels;
a hopper frame;
a dispensing hopper mounted on said hopper frame, said hopper having an opening for dispensing flooring material, a screed blade for distributing flooring material positioned rearwardly of said opening, and hopper wheels for supporting said hopper;
an elongated rod interconnecting said chassis and said hopper frame for towing said hopper on said hopper frame behind said chassis; and
said elongated rod having a first end hingedly and pivotally attached to said chassis and a second end swivelably connected to said hopper frame to permit said hopper mounted on said hopper frame to move independently of said chassis and to swivel in a plane normal to a subfloor, to hinge in a plane normal to said subfloor and perpendicular to the plane of swiveling and to pivot in a plane parallel to the subfloor.

15. An applicator for applying seamless flooring material to a subfloor, comprising:

a steerable motorized chassis mounted on chassis wheels,
a hopper frame,
a dispensing hopper mounted on a hopper frame, said hopper having an opening for dispensing flooring material, a screed blade for distributing flooring material positioned rearwardly of said opening, and hopper wheels for supporting said hopper,
an elongated rod interconnecting said chassis and said hopper frame for towing said hopper on said hopper frame behind said chassis, said elongated rod having a first end hingedly and pivotally attached to said chassis and a second end swivelably connected to said hopper frame to permit said hopper mounted on said hopper frame to move independently of said chassis and to swivel in a plane normal to a subfloor, to hinge in a plane normal to said subfloor and perpendicular to the plane of swiveling and to pivot in a plane parallel to the subfloor,
said first end of said elongated rod attached to said chassis via a goose neck tongue,
said goose neck tongue including a collar,
a disc hingedly attached to said collar,
said disc pivoting about a steering shaft on said chassis for enabling said hopper on said hopper frame to pivot in a plane parallel to the subfloor and move in a hinging manner in a first plane normal to said subfloor independently of said chassis.

16. An applicator for applying seamless flooring material to a subfloor, comprising:
a steerable motorized chassis;
chassis wheels on which said motorized chassis is mounted;
a hopper frame;
a dispensing hopper mounted on a hopper frame, said hopper having an opening for dispensing flooring material, a screed blade for distributing flooring material positioned rearwardly of said opening, and hopper wheels with an axle directly above said screed blade for supporting said hopper;
an elongated rod interconnecting said chassis and said hopper frame for towing said hopper on said hopper frame behind said chassis;
said elongated rod having first and second ends,
said first end of said elongated rod hingedly and pivotally attached to said chassis to enable said hopper mounted on said hopper frame to move independently of said chassis in a first direction with respect to a subfloor and in a second direction with respect to said subfloor; and
said second end of said elongated rod swivelably connected to said hopper frame to permit said hopper mounted on said hopper frame to move independently of said chassis in a third direction with respect to said subfloor.

* * * * *